(12) United States Patent
Shu (10) Patent No.: US 6,188,393 B1
(45) Date of Patent: Feb. 13, 2001

(54) SCROLL BAR INPUT DEVICE FOR MOUSE

(75) Inventor: Andy Shu, Taipei Hsien (TW)

(73) Assignee: Sysgration Ltd., Taipei Hsien (TW)

( * ) Notice: Under 35 U.S.C. 154(b), the term of this patent shall be extended for 0 days.

(21) Appl. No.: 09/166,066

(22) Filed: Oct. 5, 1998

(51) Int. Cl.[7] .............................. G09G 5/00; G09G 5/08
(52) U.S. Cl. ...................................... 345/184; 345/163
(58) Field of Search .................................. 345/163, 184, 345/167, 156, 157, 164, 165, 166

(56) References Cited

U.S. PATENT DOCUMENTS

| | | | |
|---|---|---|---|
| 5,530,455 | * 6/1996 | Gillick et al. | 345/163 |
| 5,657,051 | * 8/1997 | Liao | 345/163 |
| 5,808,568 | * 9/1998 | Wu | 345/163 |
| 5,912,661 | * 6/1999 | Siddiqui | 345/163 |
| 5,917,473 | * 6/1999 | Yeh | 345/163 |
| 5,977,953 | * 11/1999 | Tseng | 345/163 |
| 6,014,130 | * 1/2000 | Yung-Chou | 345/163 |

* cited by examiner

*Primary Examiner*—Richard A. Hjerpe
*Assistant Examiner*—Benjamin D. Bowers
(74) *Attorney, Agent, or Firm*—Dougherty & Troxell (57) ABSTRACT

This invention relates to a scroll bar input device for a mouse, the scroll bar input device being installed inside mouse body for executing a scroll up or scroll down action for the computer screen. The scroll bar input device has a base, a locating seat, a first shaft bracket, a roller, a rotating wheel, an encoder, a second shaft bracket and a microswitch. The first shaft bracket has a wheel hub with contacts, the wheel hub inserted into the rotating wheel. The encoder is in contact with first teeth of the rotating wheel to transmit or receive signals for moving up and down the computer screen.

5 Claims, 8 Drawing Sheets

SCROLL BAR INPUT DEVICE FOR MOUSE

BACKGROUND OF THE INVENTION (1) Field of the Invention

This invention relates to a scroll bar input device for a mouse, especially a scroll bar input device which is installed in the conventional mouse and can scroll a computer screen upward or downward directly from the mouse.

(2) Description of the Prior Art

The conventional mouse is used for choosing or executing input instructions, the cursor in computer screen can be moved to choose and execute the instructions displayed on the computer screen by moving the mouse. The mouse has key sets which can replace the function of some key sets on the computer keyboard. Accordingly, the mouse is virtually indispensable equipment.

The user must move the mouse to choose to scroll up or scroll down the instructions on the computer screen and press a key to execute the instruction. This kind of input method is convenient for a user to scroll up or scroll down the computer screen, but the user must move the mouse to aim at the scroll up or scroll down instruction and press a key on the mouse, which may interrupt the work and effect the computer work efficiency.

In order to resolve the above problem, input devices are being developed at present, such as in U.S. Pat. No. 5,530,455, for an optional type mouse which can control the scroll up or scroll down instruction on the mouse. This optical type of mouse being composed of LED and transistors, has a higher manufacturing cost than that of mechanical type mouse. Furthermore, the optical type of mouse has a higher disorientation rate and breakdown rate.

SUMMARY OF THE INVENTION

It is therefore the main object of this invention to provide a scroll bar input device installed in the mouse, in which the user can rotate the roller of a scroll bar input device to roll up or roll down the computer screen. When the user presses the roller downward, a microswitch will be switched to a quick scroll mode. If the user presses the roller again, the quick scroll mode will be switched back to the original scroll speed. It is another object of this invention to provide a mechanical type mouse which can read out signals to execute a scroll up or scroll down instruction, having lower manufacturing cost and higher accuracy than the known devices.

BRIEF DESCRIPTION OF THE DRAWINGS

In the drawings, which illustrate the preferred embodiments and modes of operation of the invention, and in which like reference characters designate the same or similar parts throughout the several views.

DETAILED DESCRIPTION OF THE PREFERRED EMBODIMENT

FIG. 1 to FIG. 4 shows the mouse have a mouse body 10, the front end of mouse body 10 having a key set 11 for choosing or executing input instructions, a printed circuit board 12 being installed in the mouse body 10.

The present invention, a scroll bar input device 20, is installed on the printed circuit board 12 and situated at a center of the key set 11. The scroll bar input device 20 is composed of a base 30, a locating seat 40, a first shaft bracket 50, a roller 60, a rotating wheel 70, a second shaft bracket 80 and a microswitch 90.

Figure 1:
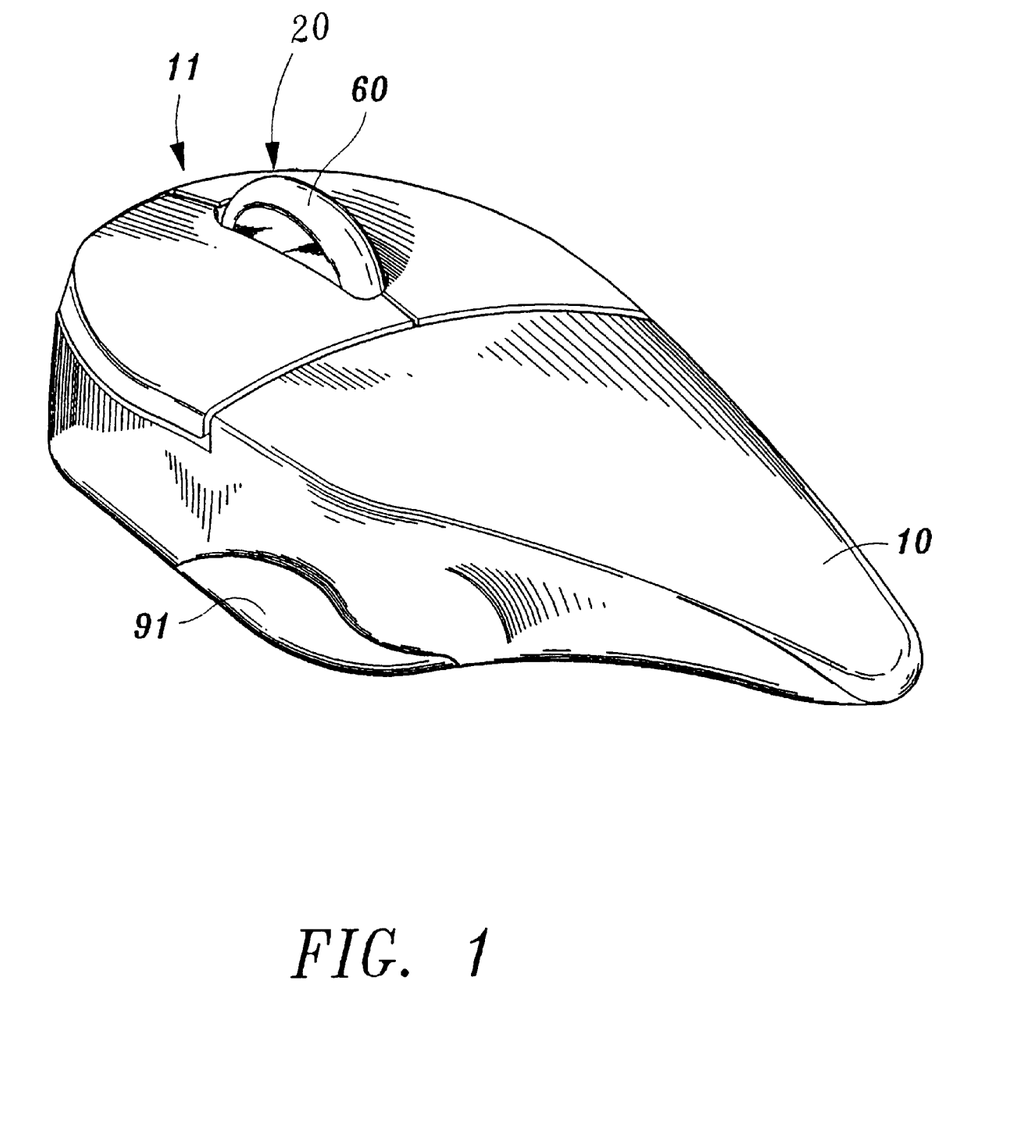
FIG. 1 is a perspective view showing a scroll bar input device for a mouse of the present invention.
Figure 2:
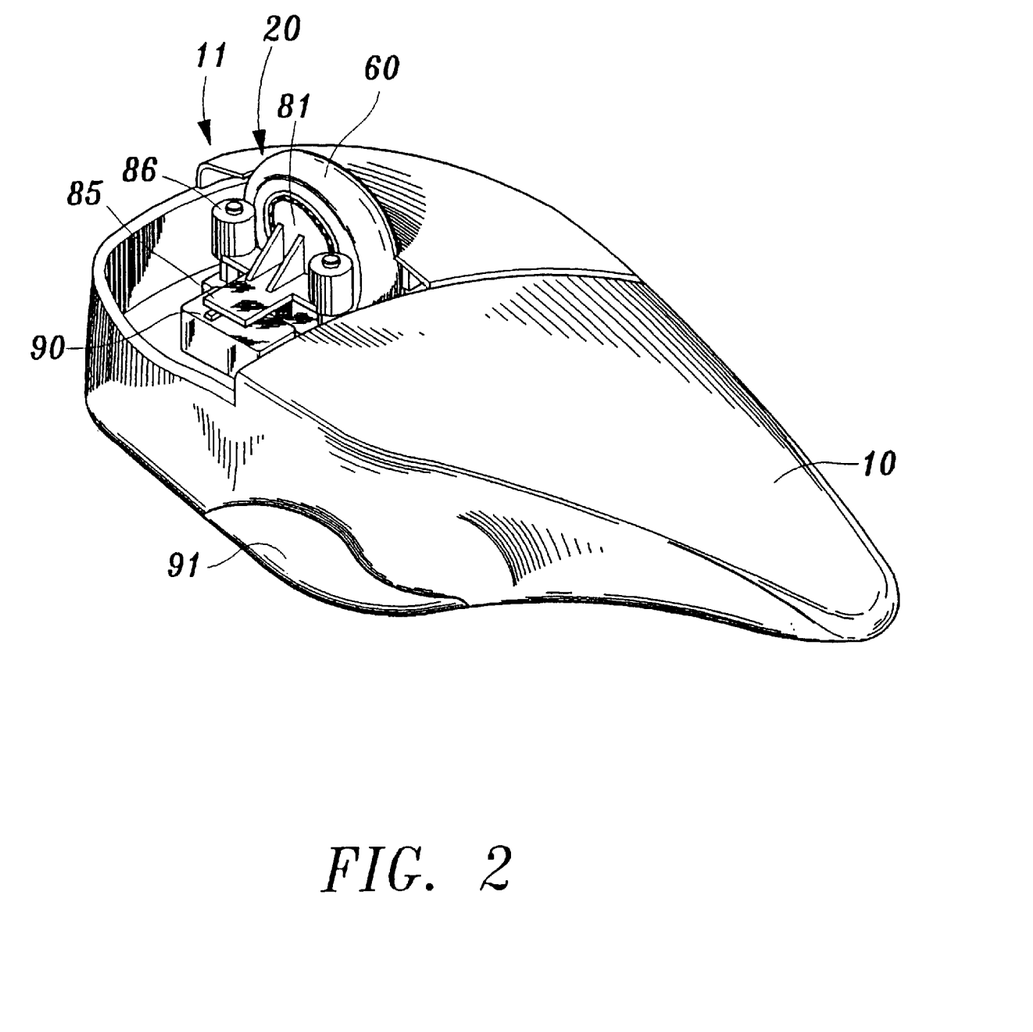
FIG. 2 is a perspective view showing the mouse of FIG. 1 with the cover removed.
Figure 3:
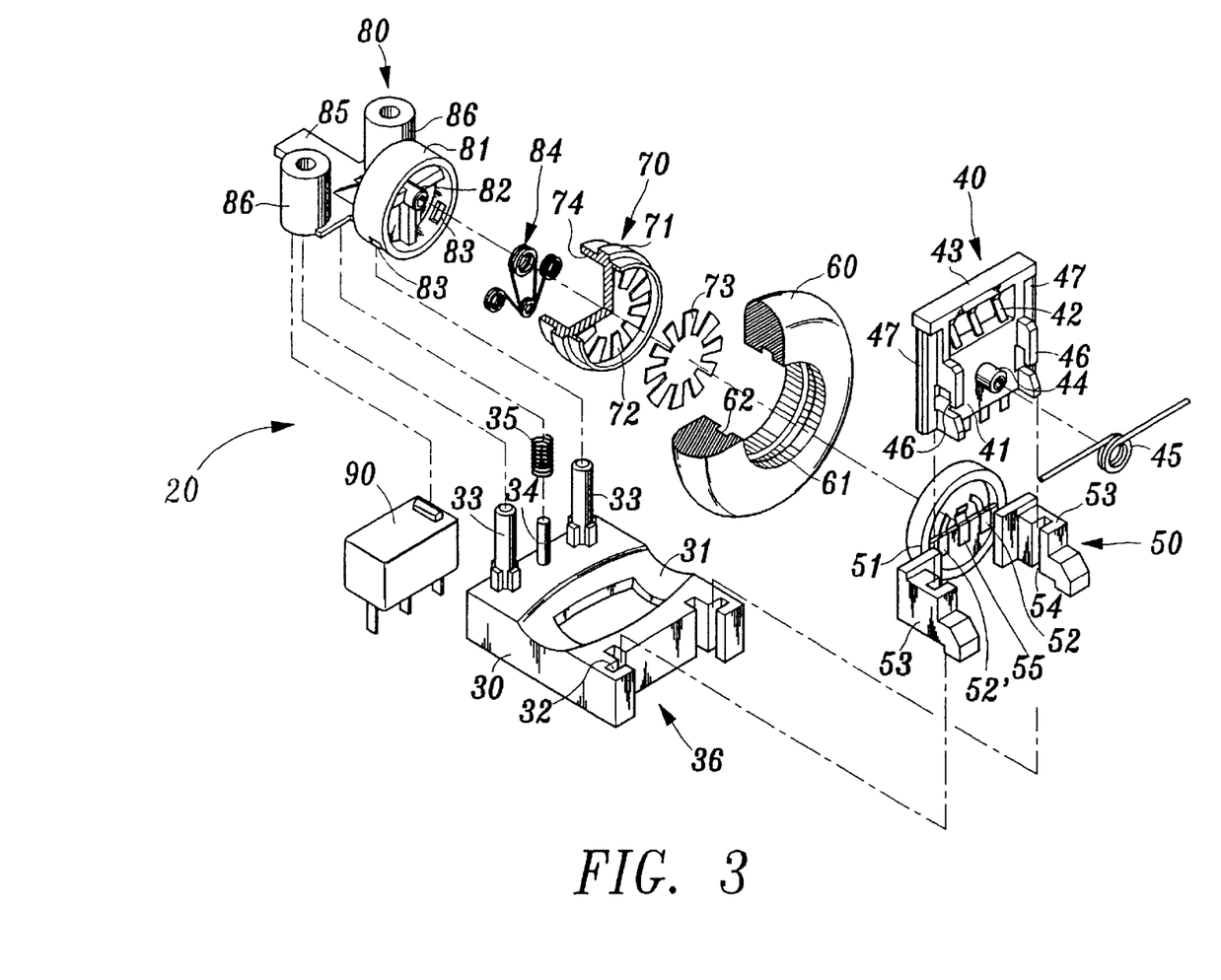
FIG. 3 is a partial exploded view of this inventions.
Figure 4:
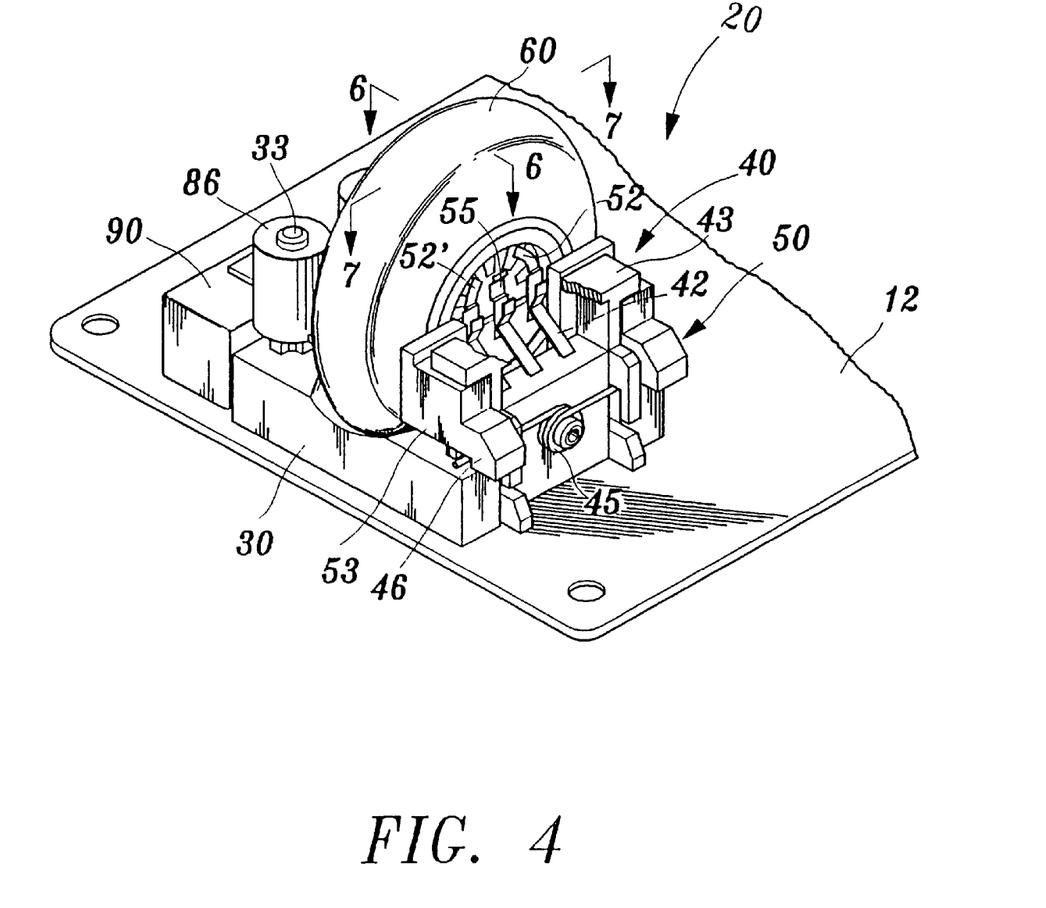
FIG. 4 is a partial perspective view showing the inner part of this invention.

The base 30 is installed on the printed circuit board 12, a center of the base 30 having a recess 31, one side of the base 30 having two inserting grooves 32 and the other side having two locating posts 33. Between the two locating posts 33 is a first post 34, with a spring 35 installed on the first post 34.

Figure 5:
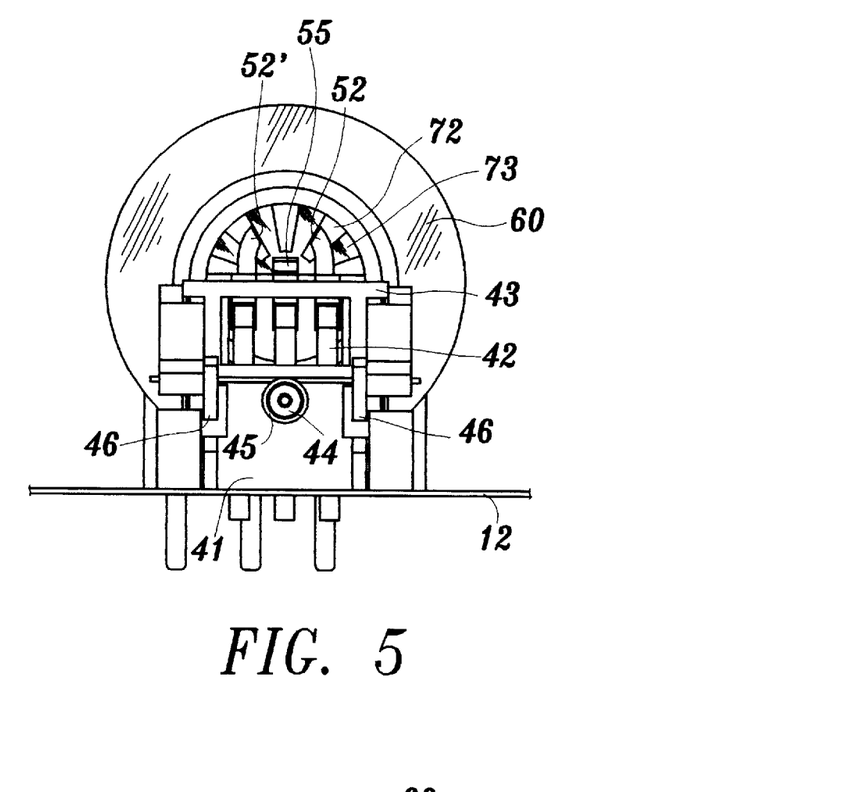
FIG. 5 is a left side view of the device of FIG. 4.
Figure 6:
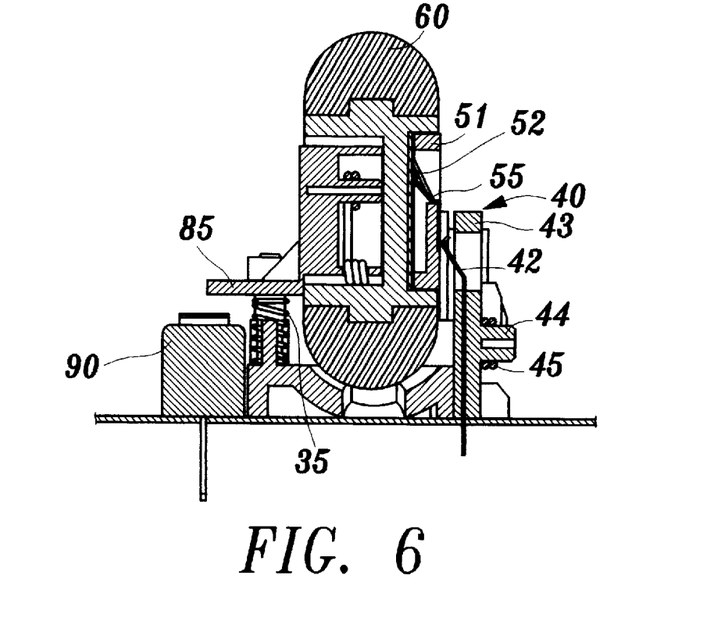
FIG. 6 is a sectional view on line 6—6 in FIG. 4.

Referring to FIG. 5 and FIG. 6, the locating seat 40 has a seat body 41 on which are three conductor plates 42, one end of each conductor plate 42 being connected with the printed circuit board 12 and the other end extending out the seat body 41. At two sides of the seat body 41 are respectively, a convex block 47 which can be inserted into the inserting grooves 32 of the base 30 to connect base 30 with locating seat 40. The seat body 41 has a cover 43, a second post 44 and two hooks 46 formed thereon, a first torsion spring 45 being installed on the second post 44. Two ends of the torsion spring 45 extend through the two hook parts 46 so as to fix the first torsion spring 45 on the second post 44.

The first shaft bracket 50 has wheel hub 51, in the wheel hub 51 having a common contact 55, at two sides of the common contact 55 are respectively a first contact 52 and a second contact 52. The common contact 55, the first contact 52 and the second contact 52' can be contacted respectively with the three conductor plates 42 to form a closed circuit. Two sides of the wheel hub 51 have respectively support plates 53, the inner wall of each support plate 53 having a sliding groove 54. The convex blocks 47 also are installed into the sliding grooves 54 so as to enable the first shaft bracket 50 to slide along the locating seat 40. The first shaft bracket 50 is stopped by the cover part 43 to prevent it from separating from the locating seat 40. Furthermore, the first shaft bracket 50 is pressed by the first torsion spring 45 and returned to its original position.

Figure 7:
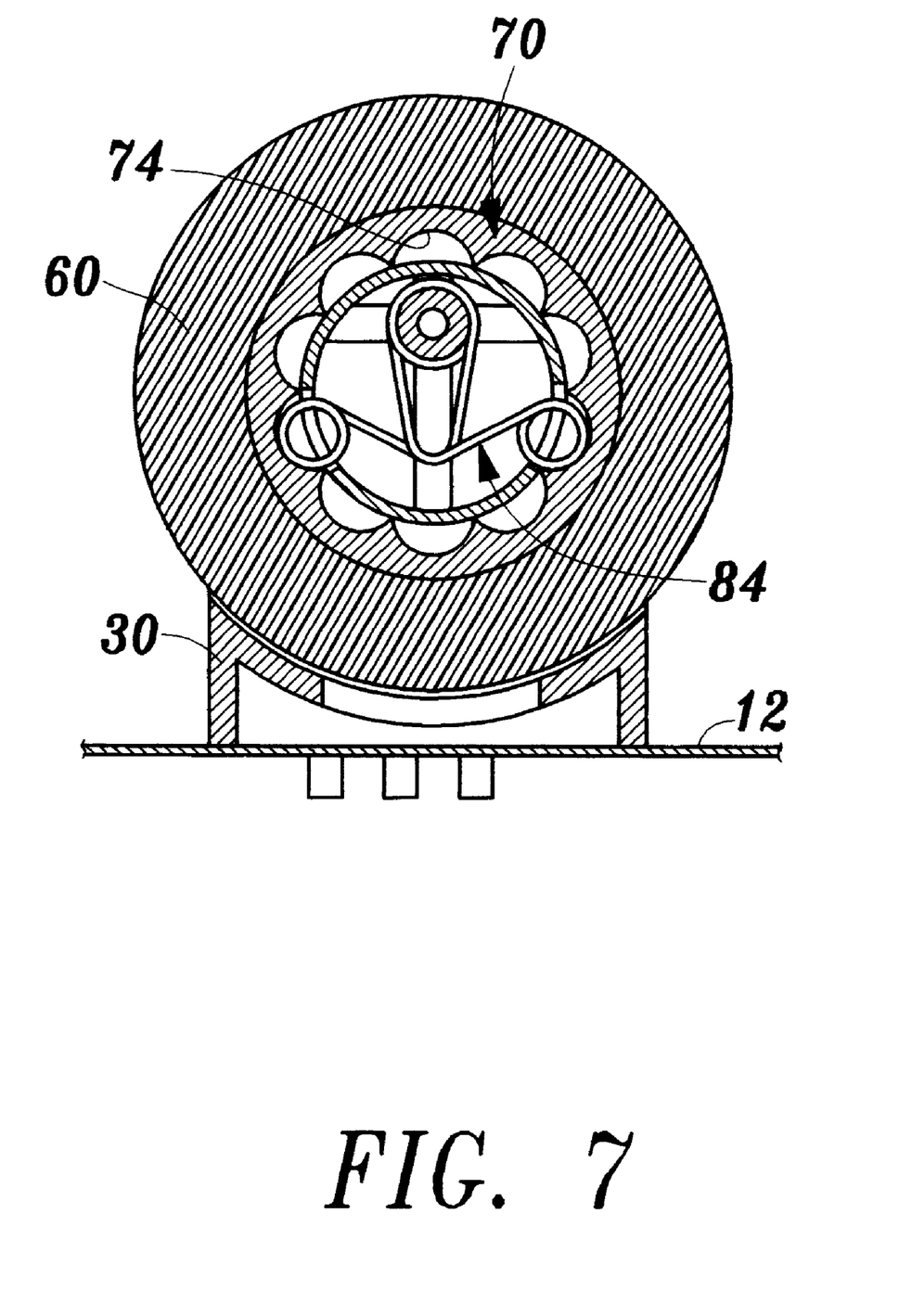
FIG. 7 is a sectional view on line 7—7 in FIG. 4.

Referring to FIG. 7, the roller 60 has a through hole 61, an inner circumference of the roller 60 having a locating groove 62. The rotating wheel 70 has flange 71, pushed into the locating groove 62 so as to fix the rotating wheel 70 in the through hole 61 of the roller 60.

Figure 8A:
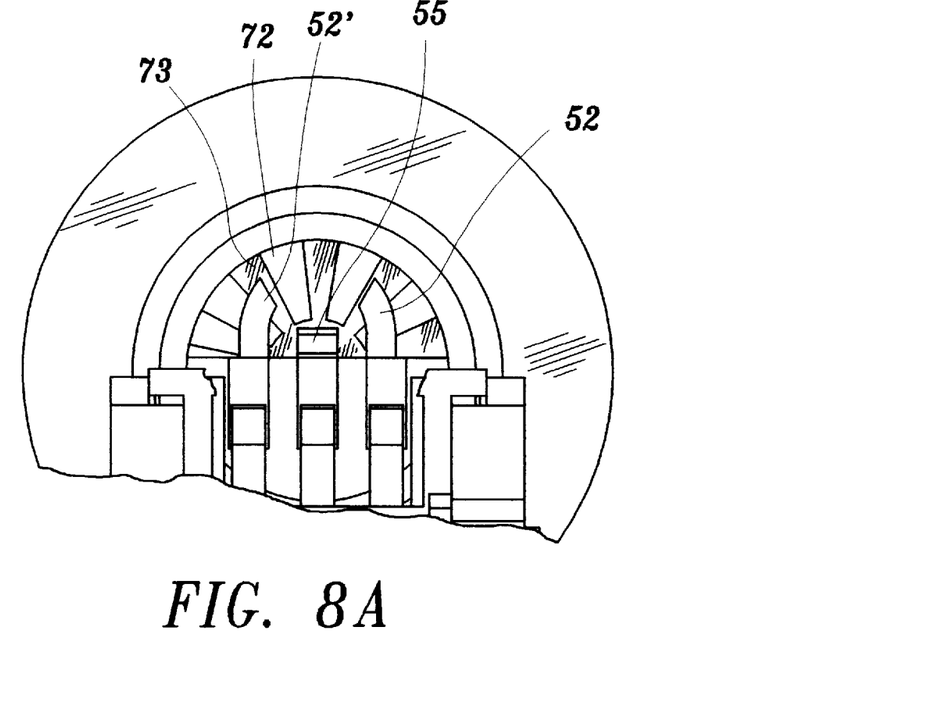
FIG. 8A is a plan view showing the closed circuit status of three contacts with the encoder of this invention.
Figure 8B:
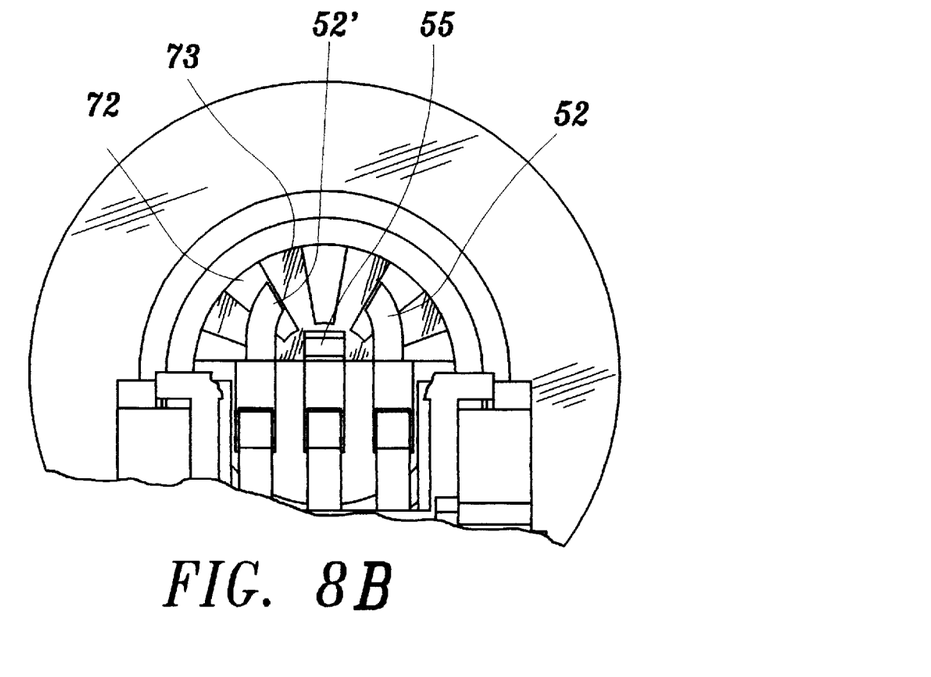
FIG. 8B is a plan view showing the opened circuit status of three contacts with the encoder of this invention.

The inner circumference of the rotating wheel 70 has a plurality of first teeth 72, an encoder 73 being engaged with the first teeth 72. The wheel hub 51 of the first shaft bracket 50 is inserted into the rotating wheel 70 such that the tops of first contact 52 and second contact 52' touch the encoder 73 or the first teeth 72, and the common contact 55 touches the encoder 73. Thus, the rotating wheel 70 and the encoder 73 can be rotated together with the roller 60 to transmit input signals by the common contact 55 and receive signals by the first contact 52 and the second 52. Referring to FIG. 8A and FIG. 8B, FIG. 8A shows a closed circuit status of three contacts with the encoder 73. At this moment, the first contact 52 and the second contact 52' are in contact with the encoder 73. FIG. 8B shows an opened circuit status of the three contacts with the encoder 73. At this moment, the first contact 52 and the second contact 52' contact the first teeth 72. The other side of the inner circumference of the rotating wheel 70 has a plurality of second teeth 74.

The second shaft bracket 80 has a cylinder 81 with a longitudinal shaft 82. The cylinder 81 is inserted into one side of the rotating wheel 70 and located by the second teeth 74. An inner circumference of the cylinder part 81 has two fixing holes 83. A second torsion spring 84 is installed on the longitudinal shaft 82, with two ends of the second torsion spring 84 extending out of the fixing holes 83 respectively and fitted with the second teeth 74 so as to locate the rotating wheel 70 and roller 60 when the roller 60 is not rotating. The second shaft bracket 80 has a push plate 85 and two locating tubes 86. The locating posts 33 are inserted into the locating tubes 86 to connect the second shaft bracket 80 to the base 30. After the user pushes down the roller 60, the roller 60, the first shaft bracket 50 and the second shaft bracket 80 can be returned to their original positions by means of the spring 35 and the first torsion spring 45.

The microswitch 90 is installed at one side of the base 30, such that, when the user presses the roller 60 downward, the microswitch 90 will be switched to a quick scroll mode. When the user presses the roller 60 again, the scroll mode will be switched to the original scroll speed.

Figure 9A:
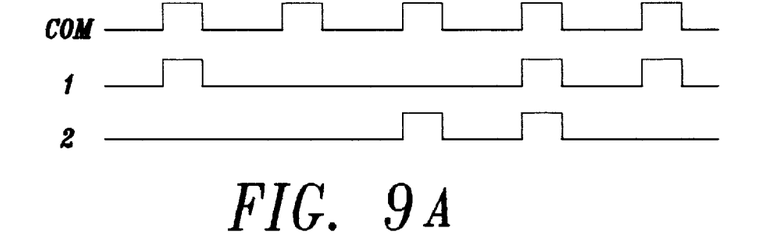
FIG. 9A is a plan view showing the impulse wave chart of roller rotating in a clockwise direction.
Figure 9B:
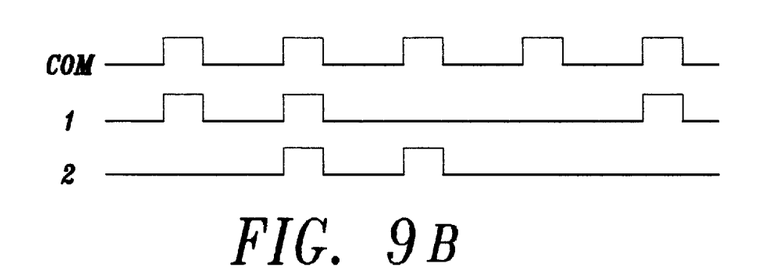
FIG. 9B is a plan view showing the impulse wave chart of roller rotating in an anti-clockwise direction.
Figure 9C:
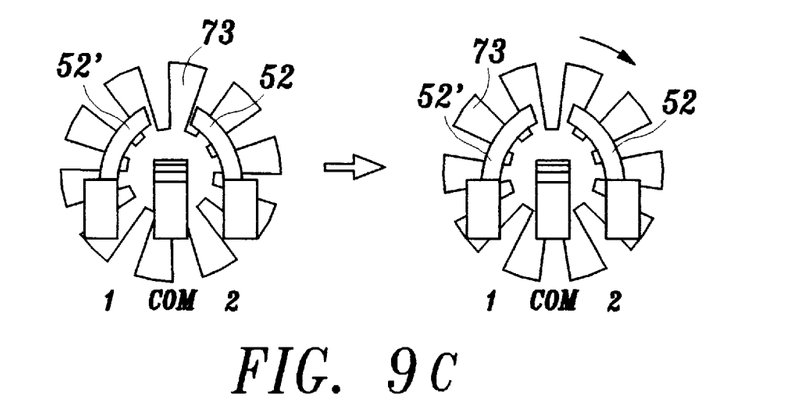
FIG. 9C is a schematic plan view showing the encoder rotating in a clockwise direction.
Figure 9D:
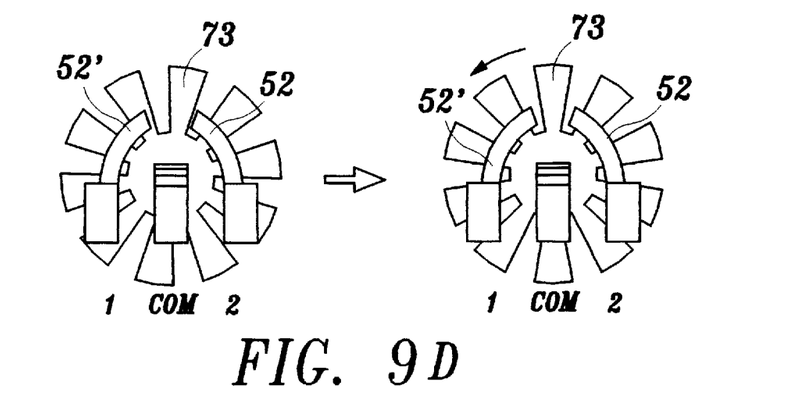
FIG. 9D is a schematic plan view showing the encoder rotating in anti-clockwise direction.

The FIG. 9A shows the impulse wavechart of the roller rotating in a clockwise direction. Referring to FIG. 4 again, the input signals are transmitted from the common contact 55 and received by the first contact 52 and the second contact 52'. The receiving signals are (1,0), (0,0), (0,1), (1,1), 1,0) in order. The FIG. 9B shows the impulse wave chart of the roller rotating in an anti-clockwise direction. The signals are transmitted from the common contact 55 and received by the first contact 52 and the second contact 52', the receiving signals are (1,0), (0,0), (0,1), (1,1), (1,0) in order. Accordingly, the computer can detect the roller 60 rotating in a clockwise or in an anti-clockwise direction by the order of the receiving signals. Referring to FIG. 9C, as the encoder 73 rotates one pitch clockwise, the first contact 52 and the second contact 52' are in an opened circuit status, and its receiving signals will be changed from (1,0) into (1,1). FIG. 9D shows the encoder 73 rotating one pitch anti-clockwise, the first contact 52 and the second contact 52' are in a closed circuit status, and its receiving signals will be changed from (1,0) into (0,0), such that, the computer can determine to scroll the screen upwardly or downwardly. Furthermore, this invention is a mechanical type mouse which can read out input signals accurately and with fewer errors.

The mouse body 10 has a key set installed at one side of the mouse body 10 to replace the function of the original middle key on the mouse body 10.

It is understood by those skilled in the art that the foregoing description is a preferred embodiment of the disclosed device and that various changes and modifications may be made in the invention without departing from the spirit and scope thereof.

What is claimed is:

1. A scroll bar input device for a mouse having a mouse body and a scroll bar input device, a front end of the mouse body having a key set for choosing and executing input instructions, a printed circuit board inside the mouse body, the scroll bar input device being situated at a center of the key set, and comprising:

a base installed on said printed circuit board, said base having two inserting grooves and two locating posts, and a first post having a spring located between the two locating posts;

a locating seat having a seat body, with three conductor plates, one end of each of the conductor plates being connected with said printed circuit board, opposite ends of the conductor plates extending out of said seat body, a convex block located on two ends of said seat body inserted into said two inserting grooves, said seat body having a second post with a first torsion spring thereon;

a first shaft bracket having a wheel hub, a common contact, a first contact and a second contact, two sides of the wheel hub each having a support plate, an inner wall of each support plate having a sliding groove slidably engaged with the convex blocks of the locating seat, such that, said first shaft bracket can slide along said locating seat;

a roller having a through hole formed at its center, an inner circumference of the roller having a locating groove;

an encoder;

a rotating wheel, with opposite sides of the rotating wheel having a plurality of first teeth and a plurality of second teeth, respectively, said encoder being engaged with the first teeth, the wheel hub of said first shaft bracket being inserted into the rotating wheel such that said first and second contacts touch said one of said encoder and said first teeth and said common contact touches said encoder, as said rotating wheel and said encoder are rotated by said roller, said common contact transmitting signals, and said first and second contacts receiving signals;

a second shaft bracket having a cylinder with a longitudinal shaft, said cylinder inserted into said rotating wheel and located by said plurality of second teeth, an inner circumference of the cylinder having two fixing holes, a second torsion spring installed on the longitudinal shaft, such that two ends of the second torsion spring extend outwardly through the fixing holes and are fitted with said second teeth to locate said rotating wheel and the roller, said second shaft bracket having a push plate and two locating tubes slidably engaged with said locating posts;

a microswitch installed on said base and situated under said push plate of said second shaft bracket, whereby said push plate actuates said microswitch when said roller is pushed by a user.

2. The scroll bar input device for a mouse as claimed in claim 1, wherein said mouse body has a key set installed at one side of said mouse body.

3. The scroll bar input device for a mouse as claimed in claim 1, wherein a center portion of said base has a recess.

4. The scroll bar input device for a mouse as claimed in claim 1, wherein said locating seat has a cover for stopping said first shaft bracket from sliding out of said grooves.

5. The scroll bar input device for a mouse as claimed in claim 1, wherein said locating seat has two hooks, two ends of said first torsion spring extending through the two hooks to fix said first torsion spring on said second post.

* * * * *